April 14, 1942.　　　B. S. AIKMAN　　　2,279,432
BRAKE CONTROL MEANS
Filed Aug. 31, 1939　　　3 Sheets-Sheet 2
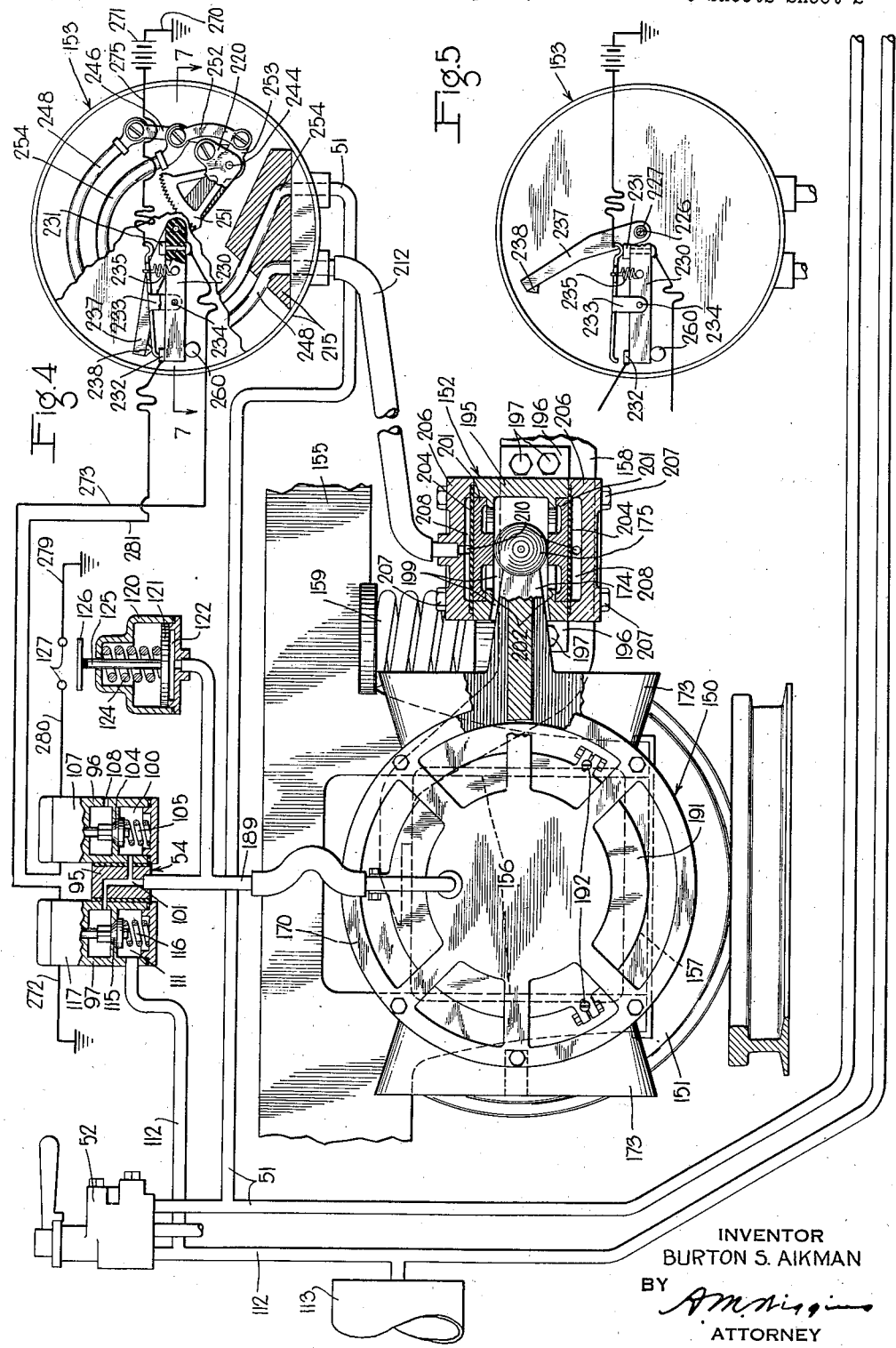
INVENTOR
BURTON S. AIKMAN
BY
ATTORNEY April 14, 1942.  B. S. AIKMAN  2,279,432
BRAKE CONTROL MEANS
Filed Aug. 31, 1939  3 Sheets-Sheet 3
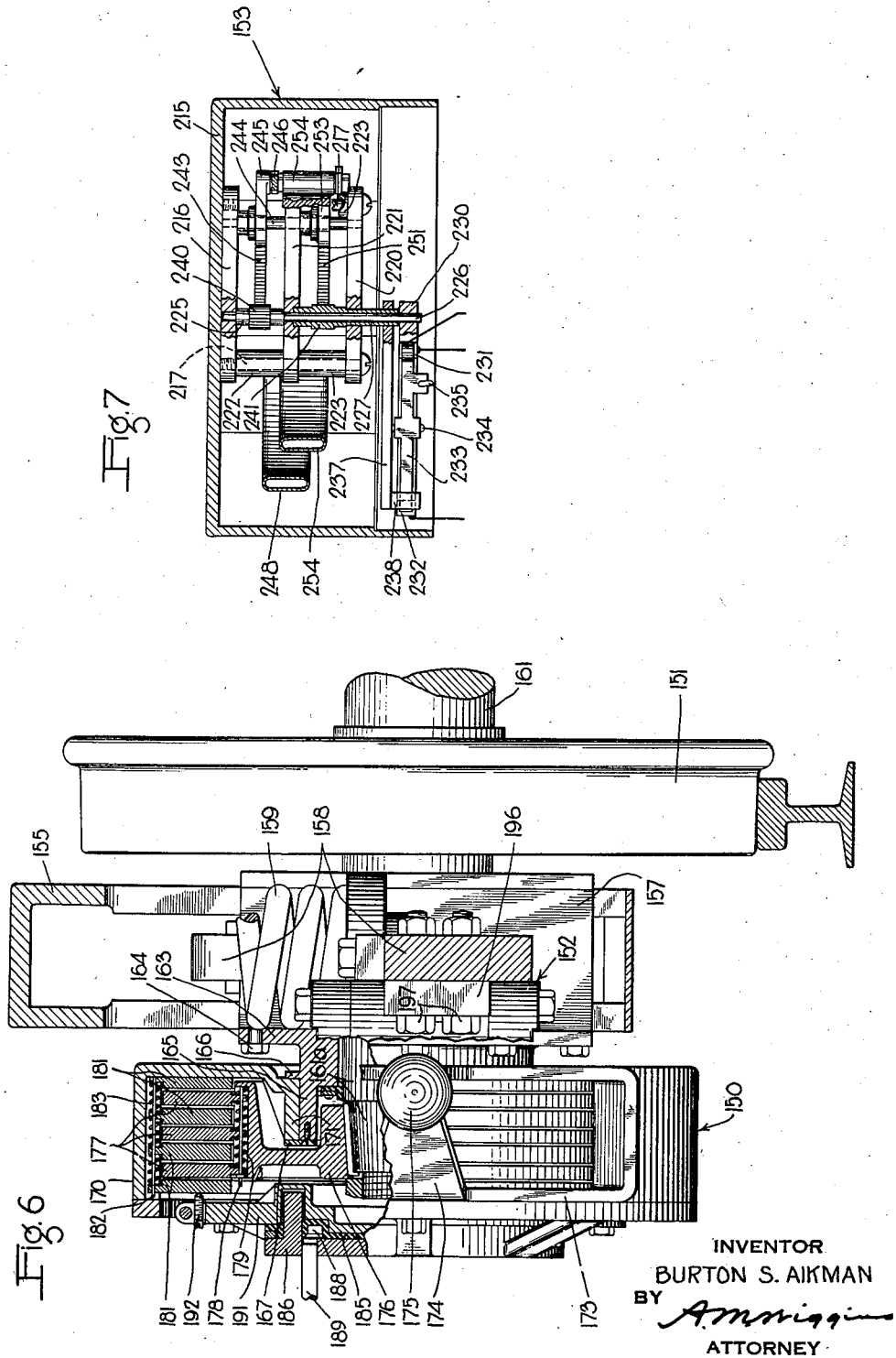
INVENTOR
BURTON S. AIKMAN
BY
ATTORNEY Patented Apr. 14, 1942

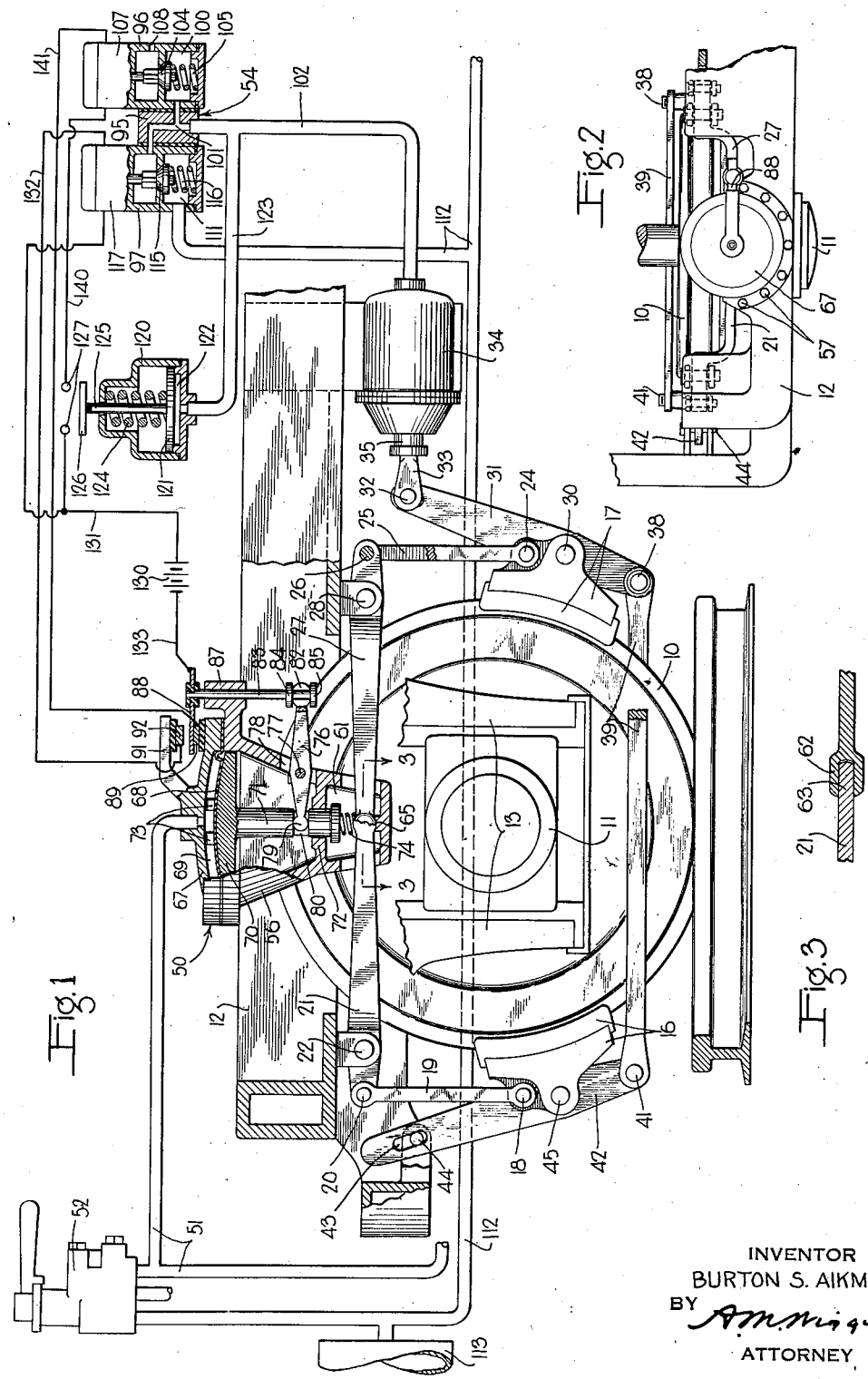

2,279,432

UNITED STATES PATENT OFFICE 2,279,432

BRAKE CONTROL MEANS

Burton S. Aikman, Wilkinsburg, Pa., assignor to The Westinghouse Air Brake Company, Wilmerding, Pa., a corporation of Pennsylvania Application August 31, 1939, Serial No. 292,831

7 Claims. (Cl. 303—21)

This invention relates to vehicle brake systems, and more particularly to a fluid pressure brake equipment embodying means responsive to the braking torque effective on a wheel for controlling the force with which the brakes are applied.

It has been proposed to provide brake apparatus for a vehicle, including mechanism automatically operative in accordance with the torque produced by cooperation of a rotating member with a relatively stationary brake member for preventing the braking force from exceeding a predetermined value, thereby avoiding sliding of the vehicle wheels. Adequate control of the brakes for certain classes of railway service may be obtained with braking apparatus operative on this principle, in which movement of a torque responsive member is utilized to limit the degree of the brake application so as to prevent the locking of the wheels. However, the requirements of other classes of service are such that they are met only by providing a brake equipment embodying torque control means of the above type which is operative to control the application of the brakes on individual wheel and axle units over a range of different degrees of braking force, the desired degree of brake application being at all times under the control of the engineer.

It is a principal object of the present invention to provide a torque controlled brake equipment having the desirable features above mentioned.

Another object of the invention is to provide a fluid pressure brake equipment including means responsive to the torque exerted on wheel brake devices for regulating the degree of brake application on an individual wheel and axle unit to any one of a plurality of different values selected by the engineer.

A further object of my invention is to provide an electro-pneumatic brake apparatus by operation of which the application of the brakes may be effected to various degrees according to the pressure of fluid in a control pipe as determined by the engineer, while the braking force with which the brakes are applied on individual wheels is automatically limited to a safe value in accordance with the braking torque produced.

It is also an object of this invention to provide a torque controlled fluid pressure brake apparatus of the above type which may readily be designed and adapted for use on a vehicle having clasp brake rigging, or on a vehicle equipped with a so-called disk brake apparatus having interleaved stationary and rotatable braking elements.

Other objects and advantages of the invention will appear in the following more detailed description thereof, taken in connection with the accompanying drawings, wherein Fig. 1 is a diagrammatic elevational view of one form of brake equipment for a vehicle wheel constructed in accordance with the invention;

Fig. 2 is a reduced detail fragmentary plan view of the wheel and associated braking elements shown in Fig. 1;

Fig. 3 is a sectional view taken on the line 3—3 of Fig. 1;

Fig. 4 is a diagrammatic elevational view of another form of vehicle brake equipment constructed in accordance with the invention;

Fig. 5 is a view of the brake control switch device shown in Fig. 4, illustrating the device in a different operative position;

Fig. 6 is an end view, partly in section, of the wheel and associated brake elements shown in Fig. 4; and Fig. 7 is an enlarged detail sectional view of the control switch device taken on the line 7—7 of Fig. 4.

*Equipment shown in Figs. 1 and 2*

Referring to Fig. 1 of the drawings, one form of brake control apparatus embodying my invention is therein illustrated in association with a vehicle truck having clasp brake rigging. Included in the drawings is a vehicle wheel 10 secured to an axle mounted in a suitable journal structure 11, on which is supported in the usual manner a vehicle truck, which is illustrated in fragmentary form and comprises a side frame member 12 having the usual pedestal jaw portions 13 within which the journal structure 11 is mounted. The clasp brake rigging includes a pair of brake shoes and heads 16 and 17, which are disposed at opposite sides of the wheel 10 and somewhat below the horizontal center line thereof, the brake shoe head 16 being pivotally connected by means of a pin 18 to a hanger member 19 which is in turn pivotally connected by a pin 20 to the outer end of a substantially horizontally disposed lever 21 that is journaled on a pin 22 carried by the side frame member 12. The other brake shoe and head 17 is similarly hung from the side frame member by means of a pin 24, hanger member 25, pin 26 and lever 27, which is aligned with the lever 21 and is pivotally connected by means of a pin 28 to the side frame member.

The brake head 17 is operatively connected by means of a pin 30 to a brake lever 31, the upper end of which is pivotally connected by a pin 32 to the piston rod 33 of a brake cylinder device 34, the piston rod being relatively loosely mounted within a sleeve member 35 which is adapted to be actuated by the brake cylinder piston, not shown. The lower end of the brake lever 31 carries a pin 38 to which are connected the adjacent ends of a pair of tie rods 39, which are horizontally disposed at opposite faces of the wheel 10 and have their other ends pivotally connected by means of a pin 41 to a lever 42. The lever 42 has a slot 43 formed in the upper end thereof for receiving a pin 44 which is carried by the truck frame structure, and is pivotally connected intermediate its ends by means of a pin 45 to the brake head 16. It will be understood that the brake heads and shoes 16 and 17 are thus supported through the medium of the respective hanger members 19 and 25, and that the levers 22 and 31 together with the tie rods 39 do not support the shoes but are adapted to be operated to effect application of the shoes against the wheel 10, as hereinafter explained.

According to the invention, the reactive force to which the brake shoes 16 and 17 are subjected during an application of the brakes is transmitted, as hereinafter explained, through the medium of the respective levers 21 and 27 to the mechanism of a control switch device 50, which is adapted to be conditioned in accordance with the pressure of fluid supplied to a control pipe 51, which may extend throughout the train, by operation of a self-lapping brake valve device 52. The switch device 50 controls circuits for a magnet valve device 54, which in turn is adapted to control the supply and release of fluid under pressure to and from the brake cylinder device 34. The self-lapping brake valve device may be similar to that disclosed in United States Patent 2,042,112 to Lynn and Bush, issued May 26, 1936.

The control switch device 50 comprises a casing 56, which may be disposed above the journal structure 11 of the truck and secured to the side frame member 12 in any suitable manner, as by bolts 57 shown in Fig. 2 of the drawings, the lowermost portion of the casing extending downwardly into the plane of the levers 21 and 27, which are suitably curved to clear the adjacent rim of the wheel 10 as shown. The inner ends of the levers 21 and 27 extend through suitable apertures in the casing 56 into a chamber 61 therein, the lever 27 having a clevis portion 62 formed on the end thereof for receiving the adjacent end 63 of the lever 21. It will thus be apparent that either lever may be tilted about the pivotal connection thereof with the side frame member so as to raise the inner end of that lever within the chamber 61 without effecting the other lever. The clevis portion 62 and the end 63 of the respective levers both are normally adapted to rest on a stop lug 65 formed on the casing 56 within the chamber 61.

Clamped between the casing 56 and a cover plate 67 is a flexible diaphragm 68, which has formed at the upper side thereof a chamber 69 communicating with the control pipe 51, and is engaged at its lower side by a follower member 70 having a stem 71 projecting downwardly through a suitable bore formed in a wall 72 of the casing and into the chamber 61. Upward movement of diaphragm 68 is limited by a plurality of stop lugs 73 carried by cover plate 67. The end of the stem 71 within the chamber 61 is operatively aligned with both the clevis portion 62 of the lever 27 and the end 63 of the lever 21, suitable shock absorbing means, such as a spring 74, being interposed between the end of the stem and the levers, through the medium of which shock absorbing spring movement of either lever can be transmitted to the stem as hereinafter more fully explained.

The control switch device 50 further comprises a substantially horizontally disposed lever 76 which is pivotally mounted on a pin 77 carried by the casing 56 within an aperture 78 therein, which lever has the inner end 79 thereof inserted in a slot 80 formed in the stem 71. The outer end of the lever 76 has formed thereon a clevis portion 82, through which extends the lower end of a vertically disposed rod 83 having collar portions 84 and 85 formed thereon to engage the clevis portion. The rod 83 is slidably mounted in a suitable bore formed in a bracket portion 87 of the casing 56, and carries at the upper end thereof a suitably insulated switch contact member 88, which is adapted to engage a switch contact element 89 mounted on the cover plate 67, while the various elements of the control switch device 50 are in their normal positions as illustrated. The cover plate 67 has a bracket portion 91 on which is mounted a suitably insulated switch contact element 92, which is operatively aligned with contact member 88, and is spaced from the switch contact element 89 by a sufficient distance to permit positioning of the contact member 88 in an intermediate position in which it engages neither of the two contact members.

The magnet valve device 54 comprises a pipe bracket 95 having secured to one face thereof a release magnet valve portion 96 and to the other face thereof an application magnet valve portion 97. The magnet valve portion 96 has formed therein a valve chamber 100 communicating by way of a passage 101, formed in the pipe bracket 95, and a brake cylinder pipe 102 with the brake cylinder device 34. The valve chamber contains a release valve element 104 that is normally held in seated position under the force of a spring 105 disposed in the valve chamber and is movable to unseated position upon energization of a magnet 107 to establish communication from the chamber 100 to the atmosphere by way of an exhaust port 108. The application magnet valve portion 97 has formed therein a valve chamber 111, which communicates by way of a supply pipe 112 with a suitable source of supply of fluid under pressure, such as a main reservoir 113, which may of course be carried on the locomotive together with the brake valve device 52. The supply pipe 112 is adapted to extend throughout the train as does the control pipe 51 previously described. Mounted in the valve chamber 111 is a supply valve member 115, which is normally held in seated position as shown under the force of a coil spring 116, and is adapted to be moved away from its seat upon energization of a magnet 117 for establishing communication from the chamber 111 through the passage 101 to the brake cylinder pipe 102.

A fluid pressure responsive switch device 120 is provided for cutting off the supply of electric current to either of the magnets 107 or 117 while the brakes are released. The switch device 120 comprises a casing having mounted therein a piston 121 subject on one side to the pressure of fluid in a chamber 122 communicating by way of a branch pipe 123 with brake cylinder pipe 102, and having at the opposite side a coil spring 124 which is interposed between the wall of the casing and the piston 121. A rod 125 is secured to the piston 121 and extends outwardly of the casing for carrying a switch contact member 126, which is suitably insulated from the rod and is adapted to be moved into engagement with a pair of contact elements 127 when fluid under pressure supplied to the chamber 122 as hereinafter explained.

*Operation*

When the brake equipment shown in Fig. 1 is conditioned for operation, fluid under pressure supplied to the reservoir 113 in the usual manner flows therefrom through the pipe 112 to the valve chamber 111 in the magnet valve device 54, while with the brake valve device 52 in release position, the control pipe 51 is connected to the atmosphere. If it is desired to effect an application of the brakes, the self-lapping brake valve device 52 is moved toward application position to effect supply of fluid under pressure from the reservoir 113 to the control pipe 51 according to the desired degree of application of the brakes. Fluid under pressure flowing from control pipe 51 to diaphragm chamber 69 of the control switch device 50 then acts against the diaphragm 68 to cause downward movement thereof, together with the follower member 70 and stem 71, against the force of the spring 74, so that the lever 76 is tilted in a counterclockwise direction about the pin 77, while the clevis portion 82 of the lever forces the rod 83 upwardly until the switch contact member 88 is carried into engagement with the contact element 92.

With the contact member 88 in engagement with the contact element 92, an electric circuit is closed for effecting energization of the application magnet 117 of the magnet valve device 54, which circuit includes the positive terminal of a battery or other source of power 130, a conductor 131, the application magnet 117, a conductor 132, the switch contact elements 92 and 88 and a return conductor 133 leading to the negative terminal of the battery. Upon energization of the application magnet 117, the valve 115 is moved away from its seat against the force of the spring 116, and fluid under pressure previously supplied to the chamber 111 is then conducted therefrom by way of the passage 101 and pipe 102 to the brake cylinder device 34, the piston of which is thereby actuated to force the piston rod 33 outwardly. As the piston rod 33 is thus moved outwardly or to the left as viewed in Fig. 1, it carries with it the pin 32 and brake lever 31, which lever is thereby operated to force the brake shoe 17 into engagement with the wheel 10, whereupon the lever 31 is fulcrumed at the pin 30 and is further operated to pull the connecting rods 39 to the right as viewed in the drawings, while the brake lever 42 is operated to bring the brake shoe 16 into engagement with the opposite side of the wheel, the lever 42 being fulcrumed at the pin 44.

Assuming that the wheel 10 of the vehicle is at this time rotating in a counterclockwise direction, and that the brake shoes 16 and 17 are applied to the wheel 10 in the manner just explained with normal force, it will be apparent that the torque exerted on the brake shoe 17 is transmitted therefrom through the medium of the hanger member 25 to the pin 26 carried by the lever 27, which lever is, however, prevented from tilting under the effect of such force by reason of engagement of the clevis portion 62 thereof with the stop lug 65 on the casing 56 of the control switch device. The torque exerted on the brake shoe 16, on the other hand, effects downward displacement of that shoe, together with the hanger lever 19 and pin 20, so that the lever 21 is tilted to a degree corresponding with the torque thus produced about the pin 22, the end 63 of the lever being thus raised in opposition to the pressure of fluid in the chamber 69 exerted downwardly through the medium of the diaphragm 68, follower member 70, stem portion 71 thereof and the shock absorbing spring 74.

Meanwhile, the pressure of fluid supplied in the manner just explained to the brake cylinder pipe 102 flows therefrom by way of pipe 123 to the chamber 122 in the fluid pressure switch device 120, with the result that the piston 121 is moved upwardly against the force of the light spring 124 to raise the contact member 126 into bridging engagement with the contact elements 127.

It should be understood that the various elements of the brake control equipment constructed in accordance with my invention, including the magnet valve device 54, control switch device 50, and the levers 21 and 27 connected to the clasp brake rigging, are so proportioned and arranged that the pressure of fluid supplied to the brake cylinder device 34, by operation of the application magnet valve device 97, effects the application of the brake shoes 16 and 17 to the wheel to produce a torque on the brake shoe rigging resulting in an upwardly directed force on the follower member 70 of the control switch device 50 which force is sufficient to overcome the downwardly directed pressure of fluid in the chamber 69 acting on the diaphragm 68 at substantially the same time as the effective braking force applied to the vehicle wheel reaches a desired value, corresponding to the increase in pressure of fluid in the control pipe 51 under the control of the brake valve device 52. When the upward force on the follower member 70 resulting from the torque produced on the corresponding brake shoe as just explained thus becomes greater than the pressure of fluid in the chamber 69 effective on the diaphragm 68, the follower member, diaphragm and stem 71 are consequently carried upwardly and tilt the lever 76 in a clockwise direction about the pin 77, the lever at the same time pulling the rod 83 downwardly until the switch contact member 88 is moved out of engagement with the contact members 92. As the switch contact member 88 is thus moved away from the contact element 92, the circuit for the application magnet 117 is consequently broken, and the spring 116 then becomes effective to move the application valve 115 to seated position for cutting off further supply of fluid under pressure to the brake cylinder device 34.

If the coefficient of friction between the brake shoes and the wheel remains substantially constant for all speeds of rotation of the vehicle wheel, there will be substantially no further variation in torque force transmitted to the control switch device 50, and consequently the application valve 115 of the magnet valve device 54 will remain seated, so that the pressure of fluid in the brake cylinder device 34 will be unchanged throughout the application of the brakes. If, however, the coefficient of friction just referred to increases with the reducing speed of rotation of the vehicle wheel, the resultant torque effective on the brake shoes will likewise increase, and with the wheel 10 rotating in a counterclockwise direction as already explained, the lever 21 will consequently be moved farther out of its normal position so as to shift the follower member 70 upwardly a sufficient distance to effect rotation of the lever 76 about the pin 77 until the rod 83 brings the switch contact member 88 into engagement with the contact element 89. Since the fluid pressure operated switch contact member 126 is already in engagement with the contact elements 127, this operation of the control switch device 50 effects closing of the circuit for energizing the release magnet 107 of the magnet valve device 54, the circuit including the positive terminal of the battery 130, conductor 131, the connected switch contact members 127 and 126, a conductor 140, the magnet 107, a conductor 141, the contact members 88 and 89, and the return conductor 133 connected to the negative terminal of the battery.

When the magnet 107 of the magnet valve device is thus energized, the release valve 104 is moved from its seat against the pressure of the spring 105, and fluid under pressure is then vented from the brake cylinder device 34 through the pipe 102, passage 101, chamber 100, past the unseated valve and through the discharge port 108. At this time, however, the pressure of fluid in brake cylinder device 34 and in the chamber 122 of the fluid pressure actuated switch device 120 is not reduced sufficiently to permit withdrawal of switch contact member 126 out of engagement with the contact element 127, it being understood that the spring 124 is designed to exert sufficient force to disengage the contact members only when brake cylinder pressure is reduced substantially to atmospheric pressure.

Meanwhile, as the braking force applied by the brake cylinder device 34 is gradually reduced, the torque transmitted through the medium of the shoe 16, hanger member 19 and lever 21 to the follower member 70 of the control switch device is correspondingly reduced, and with the control pipe pressure in chamber 69 maintained unchanged, the diaphragm 68 is again operated to move the follower member 70 and thereby effect turning of the lever 76 and upward movement of the rod 83 until the switch contact member 88 is again moved to its intermediate position, thereby breaking the circuit for the release magnet 107. The release valve 104 is as a result moved to seated position by spring 105 for cutting off further discharge of fluid under pressure from the brake cylinder 34. The brakes are thus still held against the wheel with sufficient force, in relation to the increased coefficient of friction, to continue the desired retarding effect on the vehicle as determined by the pressure of fluid in the control pipe 51.

If the composition of material from which the brake shoes 16 and 17 are made is such that the coefficient of friction reduces with the reducing speed of rotation of the vehicle wheel 10, instead of increasing as in the case of the operation previously explained, the force exerted on the follower member 70 of the control switch device 50 resulting from braking torque will become less than the pressure of fluid in the chamber 69, so that the follower member will be moved downwardly to effect counterclockwise rotation of the lever 76 and upward movement of the rod 83 for causing engagement of the switch contact member 88 and contact element 92, thereby reestablishing the circuit for energizing the application magnet 117, whereupon fluid under pressure will be further supplied from the supply pipe 112 to the brake cylinder device 34 for increasing the force of application of the brakes. When the force due to braking torque again balances the control pipe pressure exerted on the various elements of the control switch device 50 the magnet valve device 54 will again be operated to cut off the supply of fluid under pressure to the brake cylinder 34 as hereinbefore explained.

Thus, whether the coefficient of friction between the brake shoes 16 and 17 and wheel 10 is substantially constant, increases, or decreases in response to the variations of rotative speed of the vehicle wheel, the torque mechanism is automatically effective to regulate the pressure in the brake cylinder device 34 to a value producing a braking effect corresponding to the pressure of fluid in the control pipe 51. Accordingly, if the pressure established in the control pipe 51 is high, the torque control mechanism automatically regulates the braking force of the vehicle wheel to a correspondingly high value; if the pressure established in the control pipe is relatively low, then the torque control mechanism automatically regulates the braking force on the vehicle wheel to a correspondingly low value. It will be apparent that the control exercised by the torque responsive mechanism automatically compensate for differences in the coefficient of friction between the brake shoes and the wheel of different wheel and axle assemblies, the associated brake rigging mechanism regulating the fluid pressure in each brake cylinder to a value resulting in a substantially uniform torque on the corresponding brake shoes. Each brake unit is thereby automatically caused to contribute its proper share of braking effort for a given degree of application of the brakes.

It will be understood that if the engineer desires to vary the degree of a brake application from that initially selected, he may do so by correspondingly increasing or decreasing the pressure of fluid in the control pipe 51, in which case the torque control apparatus automatically adjusts and regulates the pressure in the brake cylinder 74 to correspondingly different values, the operation in such case being readily understandable from the description hereinbefore presented. The engineer may, of course, effect the release of the brakes at any time by operating the self-lapping brake valve device 52 to reduce the pressure of fluid in the control pipe 51 to that of the atmosphere. The operating elements of the control switch device 50 are then actuated in the manner already explained to close the circuit for energizing the release magnet 107 of the magnet valve device 54, the magnet 107 being this time maintained energized for holding the discharge valve 104 unseated until the pressure of fluid in the brake cylinder 104 has reduced substantially to atmospheric pressure, after which the fluid pressure switch device 120 is operated to break the circuit. The brake apparatus is then in release position as shown in Fig. 1.

From the foregoing it will be apparent that the brake control equipment is operative in the manner described regardless of the direction of rotation of the wheel 10, it being understood that when the wheel 10 is rotated in a counterclockwise direction while the brakes are applied, braking torque is transmitted through the medium of the brake shoe 17, hanger lever 25, and lever 27 to the control switch device 50.

Although the mode of operation of the brake control means disclosed in Fig. 1 of the drawings already described is preferred, it should be understood that the equipment embodying the invention may, if desired, be designed to respond to another resultant force in addition to braking torque set up during application of the brake shoes to the wheel. The other resultant force referred to is the downwardly directed force produced by the clasp arranged brake shoes in seeking positions farther down on the treads of the wheel, when subjected to heavy braking force tending to draw the shoes toward each other below the horizontal center line of the wheel. Referring to Fig. 1, and assuming that the brake shoes 16 and 17 are applied to the wheel 10 while the wheel is rotating in a counterclockwise direction, the force to which the brake shoes are subjected being sufficient to cause both shoes to creep downwardly along the wheel tread, it will be apparent that both levers 21 and 27 will thereby be turned about their respective pivotal connections with the side frame so that the clevis portion 62 of lever 27 and the end 63 of lever 21 are carried upwardly against the spring 74 for moving the follower member 70 and diaphragm member 68 in opposition to the pressure of fluid supplied to the control pipe 51. The force exerted on the mechanism of the control switch device through the medium of the lever 21 will probably be greater than that effected by movement of the lever 27, due to the additional force resulting from torque acting through the medium of the brake shoe 16, but the resultant or composite force transmitted through the follower member 70 will in any event be in a direction to oppose the control pipe pressure. The further operation of the brake control equipment, with the control switch device 50 designed for operation in accordance to the opposing forces of fluid pressure in the control pipe 51 and the resultant forces just referred to, will be understood from the description hereinbefore presented.

*Equipment shown in Figs. 4 to 7*

In Fig. 4 of the drawings there is disclosed a vehicle brake equipment embodying the invention in a different form. The equipment includes a disk brake mechanism 150 for applying braking force to a wheel 151, a torque responsive device 152, a control switch device 153, the fluid pressure switch 120, magnet valve device 54, and self-lapping brake device 52 shown in Fig. 1 of the drawings and hereinbefore described.

The brake mechanism 150 is similar to that shown and described in my application for a patent for a brake mechanism filed in the U. S. Patent Office April 14, 1938, Serial No. 201,866, and is shown in Figs. 4 and 6 in association with a vehicle truck that is illustrated in fragmentary form as comprising a side frame structure 155 having the usual pedestal jaw members 156 between which is slidably guided a journal structure 157, and further including an equalizer member 158 which is supported on the journal structure and carries the side frame structure through the medium of truck springs such as that indicated at 159. As is best shown in Fig. 6, the wheel 151 is secured to an axle 161 having an end portion 161a thereof extending outwardly of the journal structure 157. Surrounding a portion of the outer end 161a of the axle is an annular bearing member 163, which is secured to the journal structure 157 by suitable means such as bolts 164, and has a hub portion 165 having formed thereon an annular collar 166 and carrying a ring member 167. The ring member 167 is bolted or otherwise secured to the hub portion 165 and is spaced outwardly of the collar 166. Slidably mounted on the hub portion 165 is a housing 170, which has a flange portion 171 disposed on the hub portion 165 intermediate the collar 166 and the ring member 167. The housing 170 has formed thereon oppositely disposed ventilating ducts 173, and also carries a projecting torque arm portion 174 having a rounded end portion 175, which, as shown in Fig. 4 of the drawings, is adapted to be anchored within the torque responsive device 152 hereinafter described.

Disposed within the housing 170 and keyed or otherwise secured to the end 161a of the axle is rotor 176 carrying a plurality of annular braking plates or friction disks 177, which are respectively secured to the rotor by means of a plurality of rods 178, each of the disks having suitably apertured lugs for receiving the rod. The friction disks 177 are adapted for sliding movement along the rods 178, and are normally held in the positions shown in the drawings by a plurality of springs 179 interposed between the lugs formed on the disks and surrounding the respective rods 178. The friction disks 177 are arranged in interleaved relation with a plurality of stationary brake elements or friction disks 181, which are slidably mounted on a plurality of rods 182 carried by the housing 170 and are normally held out of engagement in the adjacent friction disks 177 by the force of a plurality of springs 183.

The several rotatable friction disks 177 and stationary friction elements 181 are adapted to be pressed together for creating braking force on the associated wheel and axle assembly by operation of a flexible diaphragm 185, which is mounted in a portion 186 of the housing structure 170 and is subject to the pressure of fluid supplied to a chamber 188 communicating with a supply pipe 189. The diaphragm 185 is engaged at the side thereof opposite that exposed to the chamber 188 by a follower plate 191, which carries a plurality of adjustable screw-threaded elements 192 engaging the outermost stationary friction element 181.

Referring again to Fig. 4 of the drawings, the torque responsive device 152 comprises a casing 195 having flange portions 196 through apertures in which bolts 197 are inserted for securing the casing to the equalizer member 158 of the vehicle truck. The casing 195 has formed therein an opening and chamber 199 for receiving the rounded portion 175 of the torque arm 174 projecting from the brake mechanism housing, which rounded portion of the torque arm is interposed between and engages a pair of oppositely disposed follower members 201 that are operatively mounted within the casing. Each of the follower members 201 is normally adapted to engage one of a pair of annular collar portions 202 formed within the casing and is mounted in engagement with one of a pair of flexible diaphragms 204, each of which is clamped between the casing 195 and a cover plate 206 that is secured by means of bolts 207 to the casing. The flexible diaphragms 204 are each exposed to one of two pressure chambers 208 which are defined within the respective cover plates 206 and are connected together at all times by way of a passage 210. The chambers 208 communicate with a conduit 212 which, together with the chambers, is adapted to be filled with a suitable pressure transmitting liquid, such as oil or glycerin, for a purpose hereinafter explained.

The control switch device 153 is illustrated in Figs. 4 and 7, and comprises a casing 215 and having secured to an inner wall thereof a plate member 216, which is held in place by means of a plurality of bolts such as that indicated by the character 217 in Fig. 7. The bolts 217 project into the casing 215 and are adapted to carry an outer plate member 220 and an intermediate plate member 221, the plate member 221 being separated from the plate member 216 by means of bushings 222 carried on the respective bolts 217, and the outer plate member being interposed between the heads of the bolts and bushing members 223 which bear against the intermediate plate member 221. A shaft 225 is rotatably mounted in suitable journal bores formed in the plate members 216 and 221, and has an extension 226 extending through an aperture in the plate member 220, over which extension is fitted a hollow shaft 227 which is journaled in the plate members 221 and 220.

Secured to the extension 226 of the shaft 225 is a switch arm 230, which is preferably formed of an insulating material and carries a pair of switch contact elements 231 and 232 adjacent the ends thereof, and which also has pivotally connected thereto, by means of a pin 234 carried intermediate the contact elements, a movable contact member 233 that is adapted to be tilted about the pin into engagement with either of the contact elements 231 and 232. As is best shown in Fig. 4, the movable contact member 233 is normally urged toward a position in which it engages the contact element 231 by the force of a tension spring 235 which is connected to the contact member 233 and to the switch arm 230. A suitably insulated switch arm 237 is secured through the other shaft 227 as is best shown in Fig. 7 of the drawings, and is provided with an offset lug portion 238 engageable with the outer end of the movable contact member 233 and operative to force the contact member into engagement with the switch contact element 232 when the two switch arms 237 and 230 are positioned as shown in Fig. 4, under operating conditions hereinafter explained.

For actuating the switch arms 230 and 237, the respective shafts 225 and 227 have formed thereon pinion portions 240 and 241, as illustrated in Fig. 7. The pinion portion 240 is intermeshed with the teeth of a rack member 243 which is rotatably mounted on a shaft 244 carried by the plate members 216, 221 and 220. The rack member has an arm portion 245 pivotally connected through the medium of a link 246 to the free end of a Bourdon tube 248, the other end of which is suitably anchored in the casing 215 and is connected with the conduit 212 containing the pressure transmitting liquid. The Bourdon tube 248 is of the usual curved form, oval in cross-section, and is adapted to flex outwardly upon an increase in the pressure of fluid therein. Similarly, the pinion portion 241 of the shaft 227 is operatively meshed with the teeth of a rack member 251, which is pivotally mounted on the shaft 244 and has an extension or arm 253 which is pivotally connected through the medium of a link 252 to the outer end of a Bourdon tube 254, the other end of which is anchored in the casing 215 and communicates with the control pipe 51.

*Operation*

The brake control equipment is illustrated in Fig. 4 as conditioned for operation, it being understood that the torque arm 174 of the disk brake housing 170 is maintained in the normal position as shown due to the opposing forces exerted on the rounded end portion 175 by the two diaphragms 204, which are held in their normal positions due to inherent tension. The chambers 208 thus contain maximum volumes of the liquid which also fills the conduit 212 and the Bourdon tube 248 as hereinbefore explained. The Bourdon tube 248 is at the same time disposed in its retracted position, wherein the link 246, rack member 243, and shaft 225 are held in the normal position as shown in Fig. 4, the switch arm 230 carried by the shaft being adapted to rest on a stop pin 260 secured to the casing.

With the equipment thus conditioned for operation, the control pipe 51 is connected to the atmosphere through suitable passages in the self-lapping brake valve device 52, so that the Bourdon tube 254 connected to the control pipe is permitted to assume its normal or retracted position as shown in Fig. 4, while the link 252, rack member 251, shaft 227 and switch arm 237 are also disposed in the normal position, the switch arm 237 being adapted to hold the movable contact member 233 in engagement with the contact element 232 against the force of the spring 235.

When it is desired to effect an application of the brakes, the self-lapping brake valve device 52 is moved into an application position and fluid under pressure thereby supplied to the control pipe 51 and to the Bourdon tube 254 communicating therewith quickly expands the Bourdon tube, the outer end of which moves the link 252 upwardly, as viewed in Fig. 4, so that the rack member 251 is turned in a counterclockwise direction about the pin 244 for rotating the shaft 225 and extension 226 in a clockwise direction. As the shaft extension 226 is thus turned in a clockwise direction, the switch arm 237 secured thereto is carried with it so that the lug 238 is withdrawn from engagement with the movable contact member 233, which is thereupon tilted about its pivotal connection with the switch arm 230 under the force of the spring 235 until it engages the contact element 231, as shown in Fig. 5 of the drawings. With the movable contact member 233 in engagement with the contact element 231, the magnet 117 of the application magnet valve device 97 becomes energized through a circuit including a grounded conductor 270 connected to the positive terminal of a battery 271, a grounded conductor 272 connected to the magnet 117, a conductor 273, the switch contact element and member 231 and 233, and a conductor 275 leading to the negative terminal of the battery.

Upon energization of the magnet 117 as just explained, the supply valve 115 is moved to unseated position against the force of the spring 116, so that fluid under pressure is then supplied from the main reservoir pipe 112 past the unseated valve and through the passage 101 and pipe 189 to the diaphragm chamber 188 of the disk brake mechanism, shown in Fig. 6. The pressure of fluid thus supplied to the chamber 188 acts through the medium of the diaphragm 185, follower member 191 and the elements 192 to force the assembled friction plates 181 into engagement with the rotating brake disks 177 carried by the wheel and axle assembly, and the wheel and axle assembly is accordingly subjected to braking force. At the same time, fluid under pressure flows from the pipe 189 to the chamber 122 of the fluid pressure switch device 120, which is thereby operated to cause the contact member 126 to bridge the contact elements 127.

When the rotating friction disks 177 and the non-rotatable friction disks 181 carried by the housing 170 are thus brought into frictional engagement, the housing 170 is subjected to a torque proportional to the braking force applied, and a resultant force is consequently transmitted through the medium of the torque arm portion 174 of the housing and the rounded end portion 175 to one of the follower members 201, depending upon the direction of rotation of the wheel 151, as will readily be understood. The flexible diaphragm 204 adjoining the follower member 201 thus subjected to the resultant force effected by braking torque is thereby operated to displace a quantity of the liquid from the adjacent chamber 208, and the consequent increase in pressure of the liquid in the conduit 212 and in the Bourdon tube 248 communicating therewith causes expansion of that member for pulling the link member 246 upwardly, as viewed in Fig. 4. The link member 246 in so moving actuates the rack member 243, shown in Fig. 7, and thereby acts through pinion 240 to turn the shaft 226 for rotating the switch member 230 in a clockwise direction and toward the other switch member 237, which has already been moved from its normal position as shown in Fig. 5.

As the switch arm 230 thus approaches the switch arm 237, the movable switch member 233 is brought into engagement with the lug 238 of the switch arm 237 and is then turned about its pivotal connection with the switch arm 230 against the force of the spring 235 until the connection between the contact member and the contact element 231 is broken. The circuit for the application magnet 117 of the magnet valve device 154 is consequently opened, and the spring 116 is then enabled to move the supply valve 115 into seated position for cutting off supply of fluid under pressure to the disk brake mechanism 150.

It will thus be apparent that the control switch device 153 is cooperative with the magnet valve device 54 to maintain the brake mechanism 150 in an application position under a braking force determined in accordance with the pressure of fluid in the control pipe 51, the chosen degree of application of the brakes remaining unchanged so long as the coefficient of friction between the rotatable brake disks and the stationary brake disks remains substantially constant. If, on the other hand, the coefficient of friction between the interleaved brake or friction disks increases or decreases during the application, the torque arm 174 will be correspondingly shifted farther away from its normal position or back toward its normal position for effecting corresponding partial release of the brakes or increased force of application thereof, as the case may be.

In the event of increase in the coefficient of friction between the interleaved friction disks of the disk brake mechanism 150, for example, the torque arm 174 is further displaced from its normal position for effecting an increase in the pressure of liquid in the corresponding chamber 208 and in the conduit 212 and Bourdon tube 248, which tube is thereby again expanded to effect further clockwise rotation of the switch arm 230 until the contact member 233 is again tilted into engagement with the contact element 232. The release magnet 107 is then energized through a circuit including the positive terminal of battery 271, grounded conductor 270, a grounded conductor 279, contact elements 126 and 127, the magnet, a conductor 281, contact elements 232 and 233, and conductor 275. The valve 104 is accordingly unseated to effect discharge of fluid under pressure from the disk brake mechanism 150 for effecting partial release of the brakes.

On the other hand, if the coefficient of friction between the friction disks of the brake mechanism 150 decreases as the speed of the vehicle wheel decreases, the torque arm 174 is proportionately relieved of braking torque, so that the diaphragm 204 previously displaced thereby is permitted to move toward its normal position for reducing the pressure of liquid in the chambers 208, conduit 212 and Bourdon tube 248. With the pressure of liquid in the Bourdon tube 248 thus reduced, the tube is permitted to retract toward its normal position, and through the medium of the associated rack member and pinion to effect movement of the switch arm 230 away from the still stationary switch arm 237 until the movable switch contact member 233 is returned by the force of the spring 235 into engagement with the contact element 231. When the switch contact member 233 engages the element 231, the application magnet 117 again becomes energized by battery 271 through the circuit already described. The supply valve 115 thereby unseated for supplying sufficient fluid under pressure by way of pipe 189 to the brake mechanism 150 to maintain a substantially constant braking effort corresponding to the pressure established in the control pipe 51.

It will be understood that if the operator desires to increase the degree of application of the brakes, he may effect a further increase in the pressure of fluid in the control pipe 51, whereupon the control switch device 153 will again become operative in the manner hereinbefore explained to cause further supply of fluid under pressure to the brake mechanism 150, while the torque responsive mechanism 152 will again function to insure that the braking force applied to the wheel of the vehicle corresponds to the control pipe pressure. In like manner, the operator may effect a partial release of the brakes by causing a reduction in the pressure of fluid in the control pipe 51.

When it is desired to effect the complete release of the brakes, the self-lapping brake valve device 52 is operated to effect reduction in the pressure of fluid in the control pipe 51 to that of the atmosphere, so that the Bourdon tube 254 communicating therewith is allowed to retract for causing rotation of the switch arm 237 in a counterclockwise direction, the outer lug 238 of the switch arm being thus carried into engagement with the movable switch contact member 233 for positioning it in engagement with the contact element 232. Energization of the release magnet 107 of the magnet valve device 154 is thus effected, and fluid under pressure is then vented from the disk brake mechanism 150 by way of the unseated release valve 104 in the manner already explained. As the force with which the brakes are applied is thus reduced, the torque responsive mechanism 152 functions to effect reduction in the pressure of liquid in the conduit 212 and in the Bourdon tube 248, so that that tube is permitted to retract along with the Bourdon tube 254, while the switch arm 230 is moved in a counterclockwise direction toward its normal position. When the pressure of fluid in the operating diaphragm chamber 188 of the brake mechanism 150, shown in Fig. 6, has been reduced sufficiently to permit the springs 183 and 178 to move the various friction members 181 and rotatable friction disks 177 out of engagement with each other, the fluid pressure switch 120 shown in Fig. 4 becomes effective to withdraw the contact member 126 from the contact elements 127, thereby breaking the circuit of the release magnet 107.

From the foregoing description of two preferred embodiments of my invention, it will be understood that a brake control equipment including features of the invention may be adapted for use with any desired type of truck brake mechanism for effecting various degrees of application of the brakes under the control of fluid pressure in a control pipe, the braking torque produced during a brake application being utilized to insure a substantially constant retarding force on the vehicle wheel corresponding to the control pipe pressure. It will further be apparent that the various elements of the control equipment, such as the control switch device and the electrically operated supply and release valve device, may be conveniently located in different positions on a vehicle truck, or if preferred may be embodied in a unitary device adapted to be carried by a suitable mounting bracket.

Although I have described two embodiments of the invention in detail, it is not my intention to limit the scope thereof to those embodiments or otherwise than by the terms of the appended claims.

Having now described my invention, what I claim as new and desire to secure by Letters Patent is:

1. In a brake mechanism for a railway truck having a wheel, in combination, a brake element operatively mounted for braking engagement with a braking surface rotatable with the wheel, fluid pressure actuating means for operating said brake element, means for supporting said brake element from the truck including a pivotally mounted lever subject to a resultant force due to braking torque produced upon engagement of the brake element with the braking surface, a movable abutment subject to a control fluid pressure variable in accordance with any desired degree of application of the brakes, and means controlling the supply and release of fluid under pressure to and from said fluid pressure actuating means including an element operatively interposed between said movable abutment and said torque responsive lever, said means being constructed and arranged to produce a retarding force which is maintained in proportion to said control fluid pressure.

2. In a brake mechanism for a railway truck having a wheel, in combination, a brake element operatively mounted for braking engagement with a braking surface rotatable with the wheel, fluid pressure actuating means for operating said brake element, means for supporting said brake element from the truck including a pivotally mounted lever subject to a resultant force due to braking torque produced upon engagement of the brake element with the braking surface, a movable abutment subject to a control fluid pressure variable in accordance with any desired degree of application of the brakes, and means responsive to relative movement of said movable abutment and said torque responsive lever for so controlling the supply and release of fluid under pressure to and from said fluid pressure actuating means as to establish and maintain a retarding force according to said control fluid pressure.

3. In a brake mechanism for a railway truck having a wheel, in combination, a brake element operatively mounted for braking engagement with a braking surface rotatable with the wheel, fluid pressure actuating means for operating said brake element, means for supporting said brake element from the truck including a pivotally mounted lever subject to a resultant force due to braking torque produced upon engagement of the brake element with the braking surface, a movable abutment subject to a fluid pressure variable in accordance with any desired degree of application of the brakes, electroresponsive valve means controlling the supply and release of fluid under pressure to and from said fluid pressure means, and control switch means controlling circuits for said electroresponsive valve means and operative in accordance with relative movement of said movable abutment and of said torque responsive lever.

4. In a brake mechanism for a railway truck having a wheel, in combination, a brake element operatively mounted for braking engagement with a braking surface rotatable with the wheel, fluid pressure actuating means for operating said brake element, means for supporting said brake element from the truck including a pivotally mounted lever subject to a resultant force due to braking torque produced upon engagement of the brake element with the braking surface, a movable abutment subject to a fluid pressure variable in accordance with any desired degree of application of the brakes, switch means subject to opposing forces exerted through the medium of said movable abutment and said torque responsive lever, said switch means being operative by said movable abutment for closing an application circuit and operative at another time by said lever for closing a release circuit, and electroresponsive valve means operative upon energization of said application circuit to supply fluid under pressure to said fluid pressure brake actuating means and upon energization of said release circuit to vent fluid under pressure therefrom.

5. In a brake mechanism for a railway truck having a wheel and braking means including a pair of brake elements arranged in clasp relation with the wheel below the horizontal center line thereof, in combination, lever means supporting said brake elements from the truck and subject to forces resulting from downward displacement of said brake elements along the tread of the wheel when said elements are subjected to relatively heavy brake applying force, a movable abutment subject to a fluid pressure variable in accordance in any desired degree of application of the brakes, and means subject to the opposing forces exerted by said movable abutment and by said lever means for controlling the force with which said brake elements are applied to the wheel.

6. Control apparatus for a vehicle brake equipment comprising a torque member subject to braking torque produced during an application of the brakes, movable abutment means operative by said torque member for establishing a fluid pressure corresponding to said braking torque, means operable to establish a control fluid pressure variable in accordance with any desired degree of application of the brakes, a Bourdon tube subject to the fluid pressure corresponding to braking torque, another Bourdon tube subject to said control fluid pressure, and electromagnetic means conditioned according to relative movement of said Bourdon tubes for controlling the application and release of the brakes.

7. In a brake mechanism for a railway truck having a wheel, a plurality of brake elements arranged in clasp relation with said wheel, and fluid pressure means for operating said braking elements; in combination, lever means pivotally mounted on the truck for carrying said brake elements and adapted to be subjected to braking torque upon application of said elements into braking relation with the wheel, movable abutment means subject to a control fluid pressure variable in accordance with any desired degree of application of the brakes, a movable member operatively interposed between said abutment means and said lever means, and valve means controlled in accordance with movement of said movable member to establish and maintain a retarding force determined by said control pressure, said valve means being operative in response to an increase in said control pressure for supplying fluid under pressure to said fluid pressure means, and operative in response to an increase in braking torque to a degree exceeding the force of said control pressure for venting fluid from said fluid pressure means.

BURTON S. AIKMAN.

CERTIFICATE OF CORRECTION.

Patent No. 2,279,432.

April 14, 1942.

BURTON S. AIKMAN.

It is hereby certified that error appears in the printed specification of the above numbered patent requiring correction as follows: Page 9, first column, line 8, claim 6, for "electromagnetic" read --electropneumatic--; and that the said Letters Patent should be read with this correction therein that the same may conform to the record of the case in the Patent Office.

Signed and sealed this 3rd day of November, A. D. 1942.

Henry Van Arsdale,
Acting Commissioner of Patents.

(Seal)